United States Patent
Coli

(10) Patent No.: US 9,054,796 B2
(45) Date of Patent: Jun. 9, 2015

(54) DUAL OPTICAL ELECTRICAL CONVERSION MODULE

(71) Applicant: FINISAR CORPORATION, Sunnyvale, CA (US)

(72) Inventor: Giuliano Coli, Sunnyvale, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 206 days.

(21) Appl. No.: 13/678,361

(22) Filed: Nov. 15, 2012

(65) Prior Publication Data

US 2013/0129340 A1    May 23, 2013

Related U.S. Application Data

(60) Provisional application No. 61/560,949, filed on Nov. 17, 2011.

(51) Int. Cl.

| | |
|---|---|
| G02F 1/00 | (2006.01) |
| H04B 10/08 | (2006.01) |
| H04B 10/12 | (2006.01) |
| H04B 10/038 | (2013.01) |
| H04B 10/40 | (2013.01) |
| H04B 10/073 | (2013.01) |

(52) U.S. Cl.
CPC .............. *H04B 10/038* (2013.01); *H04B 10/40* (2013.01); *H04B 10/0731* (2013.01)

(58) Field of Classification Search
CPC ... H04B 10/038; H04B 10/0731; H04B 10/40
USPC .............................................. 398/2, 115, 22
See application file for complete search history.

(56) References Cited

U.S. PATENT DOCUMENTS

| | | | |
|---|---|---|---|
| 7,072,584 B1* | 7/2006 | Lichtman et al. | 398/59 |
| 7,477,847 B2* | 1/2009 | Hofmeister et al. | 398/135 |
| 7,567,758 B2* | 7/2009 | Aronson et al. | 398/135 |
| 7,613,393 B2* | 11/2009 | Aronson et al. | 398/16 |
| 7,856,185 B2* | 12/2010 | Hudgins et al. | 398/135 |
| 7,995,914 B2* | 8/2011 | So | 398/5 |
| 8,606,112 B2* | 12/2013 | Tosetti et al. | 398/141 |
| 8,660,424 B2* | 2/2014 | Achkir et al. | 398/22 |
| 8,666,255 B2* | 3/2014 | Huang et al. | 398/135 |
| 2003/0128411 A1* | 7/2003 | Aronson et al. | 359/152 |
| 2003/0215232 A1* | 11/2003 | Jahn et al. | 398/41 |
| 2006/0127100 A1* | 6/2006 | Frankel et al. | 398/158 |
| 2006/0200708 A1* | 9/2006 | Gentieu et al. | 714/704 |
| 2008/0063407 A1* | 3/2008 | Singh et al. | 398/140 |
| 2008/0089693 A1* | 4/2008 | El-Ahmadi et al. | 398/135 |
| 2009/0180775 A1* | 7/2009 | Hudgins et al. | 398/25 |
| 2009/0317073 A1* | 12/2009 | Hotchkiss et al. | 398/1 |

(Continued)

*Primary Examiner* — Ken Vanderpuye
*Assistant Examiner* — Abbas H Alagheband
(74) *Attorney, Agent, or Firm* — Maschoff Brennan

(57) ABSTRACT

In an embodiment, a dual optical-electrical conversion (DOEC) module is described that includes an optical host interface, an optical network interface, and an integrated circuit. The optical host interface includes an optical transmitter and an optical receiver. The optical network interface includes an optical transmitter and an optical receiver. The integrated circuit conditions electrical signals communicated between the optical host interface and optical network interface. Optical signals received at and transmitted by the optical host interface may have different parameter requirements than optical signals received at and transmitted by the optical network interface, such as different wavelength parameters and/or fiber link length parameters.

18 Claims, 5 Drawing Sheets

(56) References Cited

U.S. PATENT DOCUMENTS

| | | | |
|---|---|---|---|
| 2010/0014868 A1* | 1/2010 | McGlynn et al. | 398/115 |
| 2010/0092184 A1* | 4/2010 | Nguyen et al. | 398/192 |
| 2010/0111532 A1* | 5/2010 | Chen et al. | 398/67 |
| 2011/0013911 A1* | 1/2011 | Alexander et al. | 398/79 |
| 2011/0135312 A1* | 6/2011 | El-Ahmadi et al. | 398/135 |
| 2013/0022359 A1* | 1/2013 | Tosetti et al. | 398/116 |

* cited by examiner

DUAL OPTICAL ELECTRICAL CONVERSION MODULE

FIELD

The embodiments discussed herein are related to dual optical-electrical conversion modules that can convert an electrical signal to an optical signal conditioned to communicate with fibers and ports of various wavelength and link length specifications.

BACKGROUND

Computing and networking technology have transformed our world. As the amount of information communicated over networks has increased, high speed transmission has become ever more critical. Many high speed transmission networks rely on optical communication devices for facilitating transmission over long distances through optical fiber links. Optical networks are thus found in a wide variety of high speed applications ranging from data center Local Area Networks (LAN) to metro and long haul optical fiber links for Internet, Voice and Video communications.

Although information data is transported over optical fibers, processing the data is still performed mainly on the host cards by Application Specific Integrated Circuits or Physical layer chips (ASIC/PHY chips). This still requires transmission through electrical traces, with losses that increase dramatically with increasing bit rate and traces' lengths. One solution to this problem is to use an electro-optical (e/o) conversion chip, also referred to as an e/o chip, on the host card, between the ASIC/PHY and the optical ports facing the optical links, but this solution limits the communication to specific link lengths and wavelengths.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments described herein generally relate to a dual optical-electrical conversion (DOEC) module.

In an example embodiment, a DOEC module includes an optical host interface, an optical network interface, and an integrated circuit. The optical host interface includes a transmitter and a receiver. The optical network interface includes a transmitter and a receiver. The integrated circuit is configured to condition electrical signals communicated between the optical host and optical network interfaces.

In another example embodiment, a method for transforming an optical signal is described. The method includes receiving a first optical signal. The method also includes converting the first optical signal to an electrical signal. The method also includes converting the reshaped and retimed electrical signal into a second optical signal. The second optical signal can be conditioned through this process to be transmittable over an optical network of varying parameters, such as of varying link lengths and wavelengths.

In yet another example embodiment, a system for transforming optical data signals to be adaptable to differing parameters between a host and a network is described. The system include an ASIC/PHY chip, an electro/optical conversion chip (e/o chip) coupled to the ASIC/PHY chip, multiple ports optically coupled to the e/o chip, and multiple DOEC modules each optically coupled to a corresponding one of the optical ports on a host side and to a network on a network side of the corresponding module. The e/o chip is configured to convert electrical data signals from the ASIC/PHY chip to optical data signals in a first form emitted to the DOEC modules coupled to the ports. Each of the DOEC modules is configured to convert optical data signals in the first form received from the e/o chip to optical data signals in a second form emitted onto the network. Each of the DOEC modules is further configured to convert optical data signals in a third form received from the network to optical data signals in a fourth form emitted to the e/o chip. The e/o chip is further configured to convert optical data signals in the fourth form received from the DOEC modules to electrical data signals emitted to the ASIC/PHY chip Utilizing a DOEC module, the system can allow optical networks of differing link lengths and wavelengths to deliver receive optical signals to a host. Likewise, the DOEC module can allow a host network to deliver transmit signals to optical networks of differing link lengths and wavelengths. In these and other embodiments, the DOEC module implements optical communication between the host and the port interfacing the link at data speeds that are higher than otherwise possible with electrical traces, and without limiting the ports on the host to single wavelength and link length applications.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. Understanding that these drawings depict only several embodiments in accordance with the disclosure and are, therefore, not to be considered limiting of its scope, the disclosure will be described with additional specificity and detail through use of the accompanying drawings, in which.

all arranged in accordance with at least one of the embodiments described herein, and which arrangement may be modified in accordance with the disclosure provided herein by one of ordinary skill in the art

DETAILED DESCRIPTION OF SOME EXAMPLE EMBODIMENTS

Example embodiments generally relate to techniques for enabling an optical host interface to transmit signals over any one of multiple fiber optic link lengths and/or using any one of multiple different wavelengths.

As mentioned above, some host ASIC/PHY cards may include an e/o chip. In these and other embodiments, an e/o chip on a host card typically only supports fiber-optic links of the same length and wavelength over all ports of the host line card. Accordingly, some example embodiments relate to a DOEC module (see 102 in FIG. 1), such as a transceiver or transponder that communicates optically, rather than electrically, with a host card, such as a host card that has an e/o chip.

Figure 1:
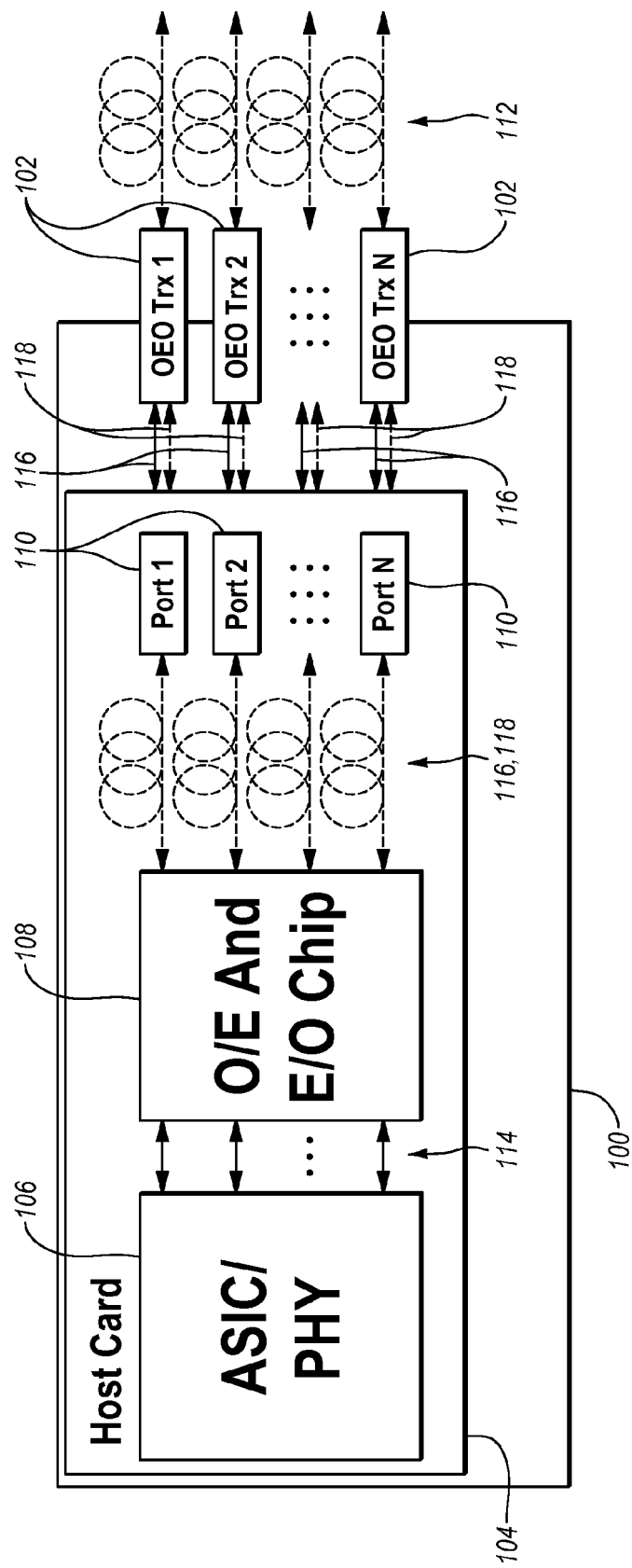
FIG. 1 schematically illustrates an example operating environment including one or more DOEC modules communicatively coupled to a host ASIC/PHY card.

FIG. 1 illustrates an example operating environment including one or more DOEC modules 102 communicatively coupled to an external host 100 including a host card 104. As illustrated, the host card 104 includes an ASIC/PHY chip 106, an e/o chip 108, and one or more ports 110. Each of the DOEC modules 102 may include one or more components as discussed below with respect to FIG. 2.

In general, the host card 104 may be configured to transmit data to and receive data from a network over fiber links 112, each of which may include one or more optical fibers. Alternately, in systems that implement wavelength division multiplexing (WDM), each of the fiber links 112 may include a distinct wavelength channel on the same optical fiber. The data communicated over the fiber links 112 may be variously embodied as high bandwidth electrical data signals 114 between the ASIC/PHY chip 106 and the e/o chip 108, high bandwidth optical data signals 116, 118 between the e/o chip 108 and the DOEC modules 102, and high bandwidth optical data signals (not shown) communicated on the fiber links 112. The high bandwidth optical data signals 116, 118 include receive optical signals 116 and transmit optical signals 118

In a transmit direction (e.g., from the ASIC/PHY chip 106 to the network), the ASIC/PHY chip 106 is configured to generate electrical transmit signals which are provided to the e/o chip 108. The electrical transmit signals generated by the ASIC/PHY chip 106 are not separately labeled but are included in the high bandwidth electrical data signals 114.

The e/o chip 108 is configured to convert the electrical transmit signals received from the ASIC/PHY chip 106 to transmit optical signals 118 included in the high bandwidth optical data signals 116, 118. Optionally, each of the transmit optical signals 118 may be communicated via respective ports 110 and over an optical fiber or other waveguide (not shown) to respective DOEC modules 102.

The ports 110 may include a mechanical interface through which the transmit optical signals generated by the e/o chip 108 may be transmitted to the DOEC modules 102, as well as electrical connections (not shown) to supply power to the DOEC modules 102.

In general, each of the DOEC modules 102 is configured to receive and optionally condition a respective one of the transmit optical signals generated by the e/o chip 108 for transmission over a respective one of the fiber links 112. Specifically, whereas each of the fiber links 112 may have a different length, each DOEC module 102 may convert the received transmit optical signal to an electrical signal, optionally condition the electrical signal as appropriate for a length of the respective fiber link 112, and emit an optical signal representative of the electrical signal at a desired wavelength.

In a receive direction (e.g., from the network to the ASIC/PHY chip 106), the DOEC modules 102 are each configured to receive and optionally condition an optical signal from a respective one of the fiber links 112 for reception by the host card 104. Specifically, each DOEC module 102 may convert the optical signal received from the respective fiber link 112 to an electrical signal, optionally condition the electrical signal as appropriate for transmission to the e/o chip 108, and emit a receive optical signal 116 representative of the electrical signal through the corresponding port 110 to the e/o chip 108. As mentioned previously, the receive optical signals 116 are included in the high bandwidth optical data signals 116, 118. Optionally, each of the receive optical signals 116 may be communicated over an optical fiber or other waveguide (not shown) to respective ports 110.

The e/o chip 108 is configured to convert the receive optical signals received from the DOEC modules 102 to electrical receive signals. Accordingly, the e/o chip 108 provides an opto-electrical (o/e) conversion and could alternatively be referred to as an "o/e chip," an "o/e and e/o chip," or other similar term. For simplicity, the chip 108 will generally be referred to herein as an "e/o chip." The electrical receive signals generated by the e/o chip 108 are not separately labeled but are included in the high bandwidth electrical data signals 114.

The ASIC/PHY chip 106 receives the electrical receive signals from the e/o chip 108.

Optionally, a low-speed electrical interface (not shown) may be provided between the host card 104 and the DOEC modules 102 over which low-speed data signals (such as alarms/warnings, controls and digital diagnostic monitoring, and the like) may be communicated electrically between the host card 104 and the DOEC modules 102. Alternately or additionally, the low-speed data may be communicated optically between the DOEC modules 102 and the host card 104.

Figure 2:
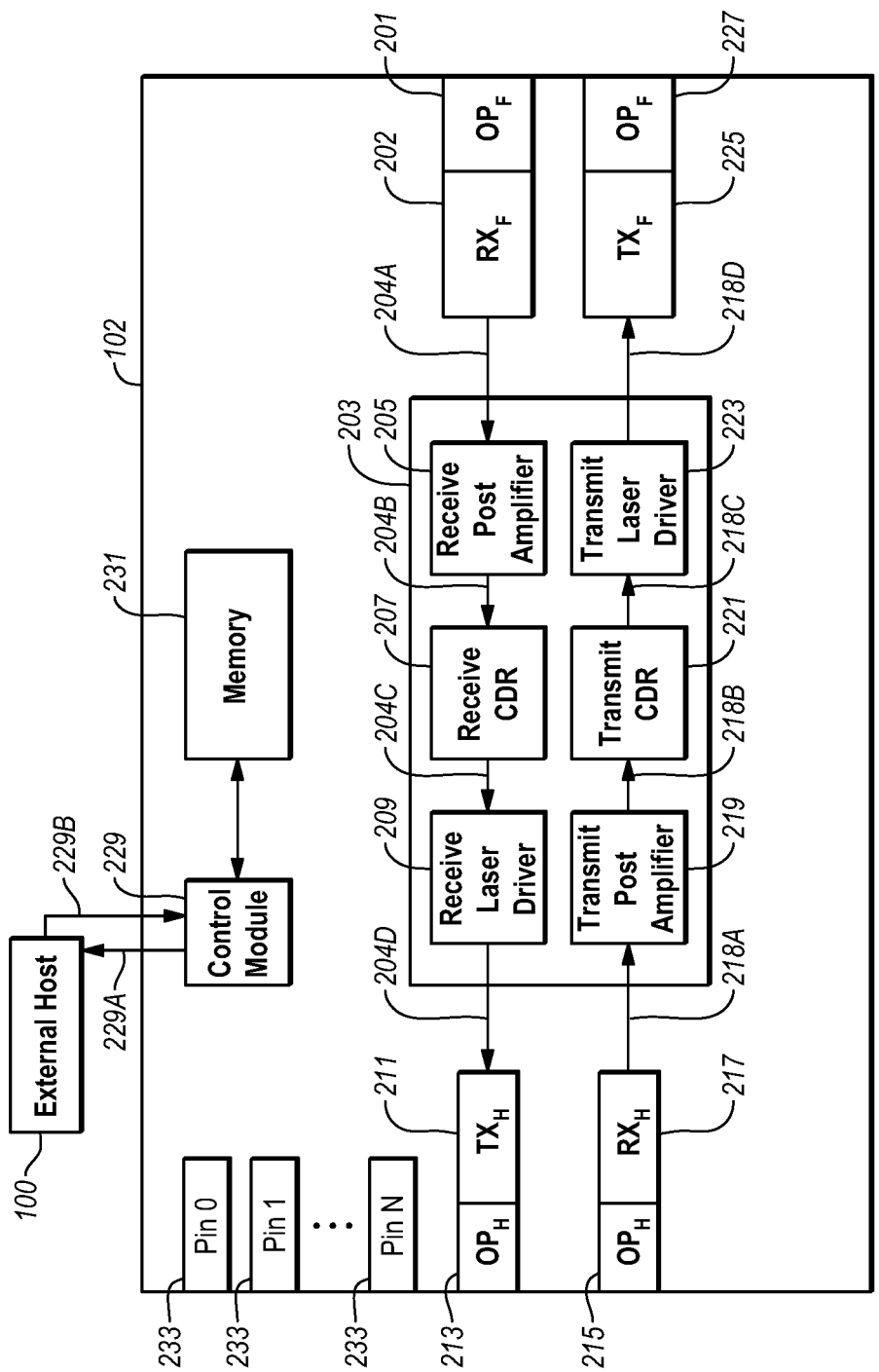
FIG. 2 schematically illustrates an example embodiment of a DOEC module that may be implemented in the operating environment of FIG. 1.

FIG. 2 illustrates an example embodiment of one of the DOEC modules 102 that may be implemented in the operating environment of FIG. 1. Each of the DOEC modules 102 of FIG. 1 may have the same configuration as the DOEC module 102 of FIG. 2, for instance. While the DOEC module 102 will be described in some detail, the DOEC module 102 is described by way of illustration only, and not by way of restricting the scope of the invention. The principles of the example embodiments described herein are suitable for any bit rate, i.e. 1 gigabit per second (G), 2G, 4G, 8G, 10G, 16G, 28G, 40G, 100G, and higher or other bandwidth fiber optic links. Furthermore, the principles described herein may be implemented in DOEC modules of any form factor such as XFP, SFP, SFF, SFP+, QSFP+, CFP, and active optical cables, without restriction. It will be appreciated, however, that the DOEC modules 102 need not comply with standardized form factor requirements and may have any size or configuration necessary according to a particular design.

The DOEC module 102 is configured to receive an optical signal from a fiber included in a corresponding fiber link 112 (FIG. 1) through a fiber-side optical port 201 at a fiber-side receiver 202. The fiber-side receiver 202 acts as an opto-electric transducer by transforming the optical signal into an electrical signal 204A. The electrical signal 204A may then be provided to one or more optional integrated circuits 203 including one or more of a receive post amplifier 205, a receive clock and data recovery 207 (CDR), and a receive laser driver 209. Alternately or additionally, the integrated circuit 203 may include a transmit post amplifier 219, a transmit CDR 221, and a transmit laser driver 223. The integrated circuit 203 including the receive post amplifier 205, the receive CDR 207, the receive laser driver 209, the transmit post amplifier 219, the transmit CDR 221 and the transmit laser driver 223 may be integrated in the same chip, may be implemented in separate chips, or any combination thereof.

The receive post amplifier 205 amplifies the electrical signal 204A to generate an amplified signal 204B and provides the amplified signal 204B to the receive CDR 207. The receive CDR 207 may, in some embodiments, reshape and retime the amplified signal 204B to generate a reshaped and retimed signal 204C. The reshaped and retimed signal 204C may be provided to a receive laser driver 209. The receive laser driver 209 receives the reshaped and retimed signal 204C and drives a host-side transmitter 211 with a drive signal 204D that causes the host-side transmitter 211 to emit an optical signal, e.g., included in the high bandwidth optical data signals 116, 118 of FIG. 1, representative of the information in the reshaped and retimed signal 204C. The host-side transmitter 211 acts as an electro-optic transducer by transforming the drive signal 204D into an optical signal. The optical signal emitted by the host-side transmitter 211 may then be transmitted through a host-side port 213 and provided to the host card 104 (FIG. 1) of the external host 100. In some embodiments, the reshaping performed by the receive CDR 207 and the configuration of the host-side transmitter 211 conditions and/or configures the optical signal emitted by the host-side transmitter 211 for the specific conditions (e.g., link length, wavelength channel) of the link between the host-side transmitter 211 and the host card 104. Accordingly, the DOEC module 102 may enable an optical signal to be suitable for any external host 100 with any given wavelength and link length parameters.

The DOEC module 102 is also configured to receive an optical signal, e.g., included in the high bandwidth optical data signals 116, 118 of FIG. 1, from the e/o chip 108 through a host-side optical port 215 at a host-side receiver 217. The host-side receiver 217 acts as an opto-electric transducer by transforming the optical signal into an electrical signal 218A. The electrical signal 218A may then be provided to a transmit post amplifier 219 included in the integrated circuit 203, which additionally includes a transmit CDR 221 and a transmit laser driver 223 in the illustrated embodiment. The transmit post amplifier 219 may amplify the electrical signal 218A to generate an amplified signal 218B and provide the amplified signal 218B to the transmit CDR 221, which may reshape and retime the amplified signal 218B to generate a reshaped and retimed signal 218C. The reshaped and retimed signal 218C may be delivered to a transmit laser driver 223 configured to drive a fiber-side transmitter 225. More specifically, the transmit laser driver 223 may receive the reshaped and retimed signal 218C and drive the fiber-side transmitter 225 with a drive signal 218D that causes the fiber-side transmitter 225 to emit an optical signal representative of the information in the reshaped and retimed signal 218C. The fiber-side transmitter 225 acts as an electro-optic transducer by transforming the drive signal 218D into an optical signal. The optical signal emitted by the fiber-side transmitter 225 may then be transmitted through a fiber-side optical port 227 onto a corresponding fiber link, such as one of the fiber links 112 of FIG. 1. In some embodiments, the reshaping performed by the transmit CDR 221 and the configuration of the fiber-side transmitter 225 conditions and/or configures the optical signal emitted by the fiber-side transmitter 225 for the specific conditions (e.g., link length, wavelength channel) of the fiber link onto which the optical signal may be emitted. Accordingly, the DOEC module 102 may enable an optical signal to be configured to work with any fiber length and/or at any specific wavelength parameters.

In the illustrated embodiment of FIG. 2, a first pathway including the receive post amplifier 205, the receive CDR 207, and the receive laser driver 209, is depicted for processing receive data, while a second distinct pathway including the transmit post amplifier 219, the transmit CDR 221, and the transmit laser driver 223, is depicted for processing transmit data. In other embodiments, the DOEC module 102 may include a single pathway including, e.g., a post amplifier, a CDR and a laser driver for processing both transmit and receive data.

Each of the fiber-side receiver 202 and the host-side receiver 217 may include any suitable optical receiver for converting optical signals to electrical signals. For instance, each of the fiber-side receiver 202 and the host-side receiver 217 may include, but is not limited to, a PIN photodiode, an avalanche photodiode, or the like.

Each of the host side transmitter 211 and the fiber-side transmitter 225 may include any suitable optical transmitter for converting electrical signals to optical signals. For instance, each of the host-side transmitter 211 and the fiber-side transmitter 225 may include, but is not limited to, a Fabry-Perot (FP) laser, a distributed feedback (DFB) laser, a distributed Bragg reflector (DBR) laser, a vertical cavity surface emitting laser (VCSEL), or the like.

In some embodiments, the host-side transmitter 211 and the host-side receiver 217 are referred to herein as an optical host interface since the DOEC module 102 emits optical signals to and/or receives optical signals from the host card 104 via the host-side transmitter 211 and the host-side receiver 217. In an analogous manner, the fiber-side receiver 202 and the fiber-side transmitter 225 may be referred to herein as an optical network interface since the DOEC module 102 receives optical signals from and/or emits optical signals to the network via the fiber-side receiver 202 and the fiber-side transmitter 225. In these and other embodiments, the integrated circuit 203 is generally configured to condition electrical signals communicated between the optical host interface and the optical network interface, such as the electrical signals 204A and 218A, as described herein.

Although not required, the DOEC module 102 may optionally include a management interface including a control module 229, one or more pins 233 of the DOEC module 102 and/or a memory 231. The management interface may communicate between the host card 104 and the DOEC module 102 to monitor low-speed signals relating to the operation of the DOEC module 102 including alarms, module controls, diagnostic monitoring, and the like. The control module 229 of the management interface may include, but is not limited to a microprocessor, a microcontroller, a processor, a controller, or other suitable processing device. The control module 229 may have access to, and may communicate electronically with the memory 231. The memory 231, in the illustrated embodiment, may be electrically erasable and programmable read only memory (EEPROM). The memory 231 and the control module 229 may be packaged together in the same package or in different packages without restriction. The memory 231 may also be any other non-volatile memory source. The control module 229 recognizes instructions that follow a particular instruction set, and may perform normal operations such as, for example, readings of temperature levels, transmit/receive power levels, and the like. Two external lines 229A and 229B are possibly implemented using a two-wire interface such as I2C as shown in FIG. 2, however other interfaces may alternately or additionally be implemented. The precise structure of the instruction set is not important to the principles described herein as the instruction set may be optimized around a particular hardware environment, and as the precise hardware environment is not important to the principles described herein.

Although not required, the DOEC module 102 illustrated in FIG. 2 may optionally provide a low-speed electrical interface including the one or more pins 233 as one component of the management interface. The pins 233 communicate low-speed data with the external host 100 to allow for digital diagnostic monitoring and readings of temperature levels, transmit/receive power levels, in addition to power supply.

Figure 3:
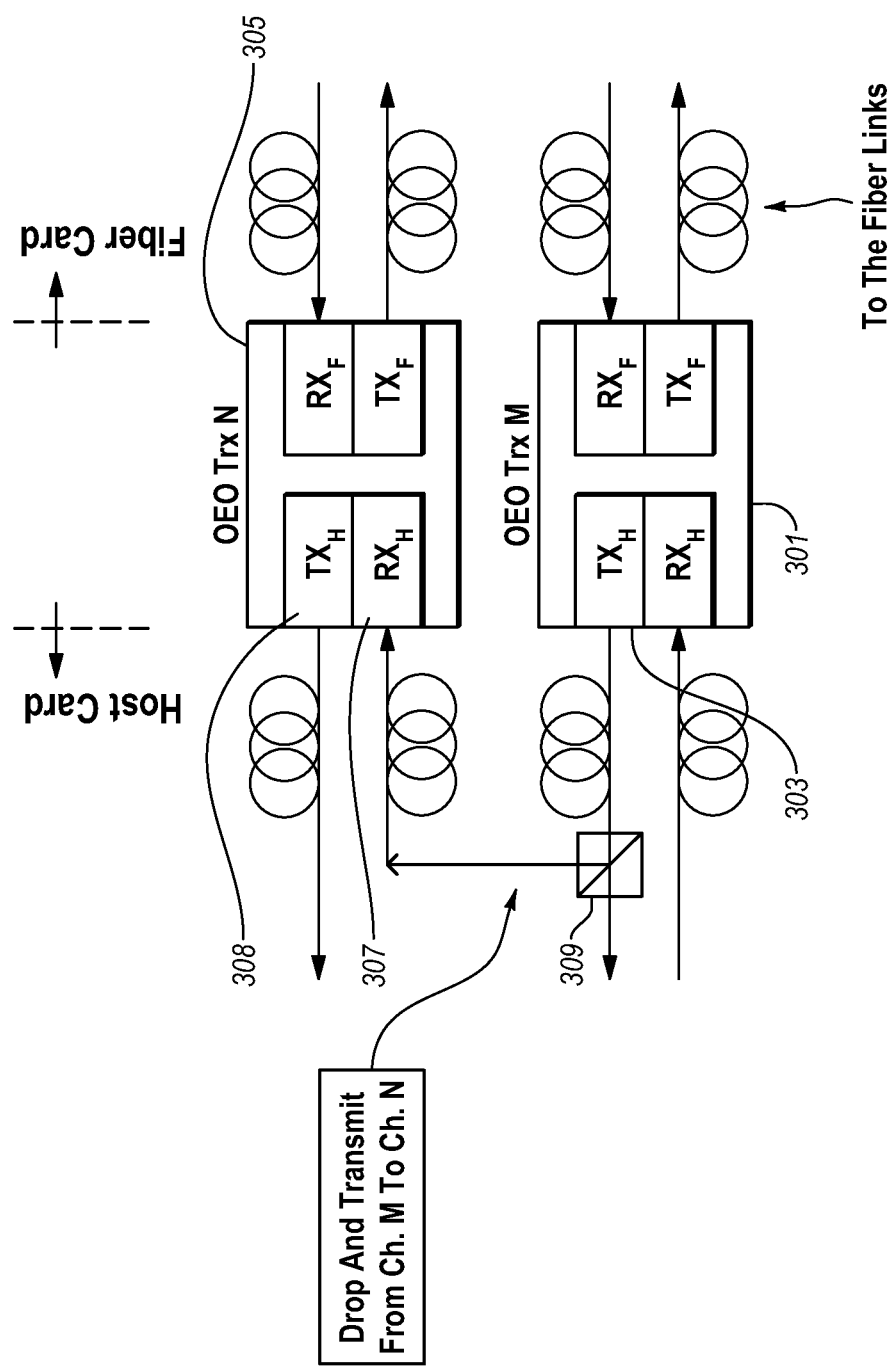
FIG. 3 schematically illustrates an example of how multiple DOEC modules may cooperate to perform drop and transmit functions.

FIG. 3 schematically illustrates an example of multiple DOEC modules 301, 305 that may be used to drop and retransmit signals. Each of the DOEC modules 301, 305 may correspond to the DOEC modules 102 described with respect to FIGS. 1-2. In more detail, when the link between a host side transmitter 303 of a DOEC module 301 and a host (not shown) is experiencing a fault, a receive signal emitted by the transmitter 303 may be dropped by the host and retransmitted through the DOEC module 305. A fault signal may be an alarm signal that indicates a fault. Specifically, a fault signal may relate to a receive signal emitted by host side transmitter 303 being unable to reach a host (not shown). Such a fault signal may be sent by the host to the module 301 possibly through a management interface to indicate the fault. A receive signal unable to reach a host (not shown) may then be redirected to a host side receiver 307 of the DOEC module 305 and then to the host through the host side transmitter 308. An integrated circuit of the DOEC module 305, such as the integrated circuit 203 described in FIG. 2, may be configured to receive the signal from the host side receiver 307 and provide the signal to the host side transmitter 308. The integrated circuit of the DOEC module 305 may reshape and retime the signal for communication to the host. Thus, FIG. 3 illustrates how multiple DOEC modules may cooperate to perform drop and transmit functions in case of fault, and may enable transmission flexibility over multiple channels.

In some embodiments, at least one reflector 309 disposed in the signal path of the signal emitted by the host side transmitter 303 can be activated such that the signal emitted by the host side transmitter 303 may be redirected to the host side receiver 307 via reflection. The reflector 309 may allow pass through when not activated. Although the embodiment of FIG. 3 depicts a single reflector 309, more generally any suitable number and location of reflectors can be provided for redirecting the emitted signal from the host side transmitter 303 of DOEC module 301 to the host side receiver 307 of the DOEC module 305.

Figure 4:
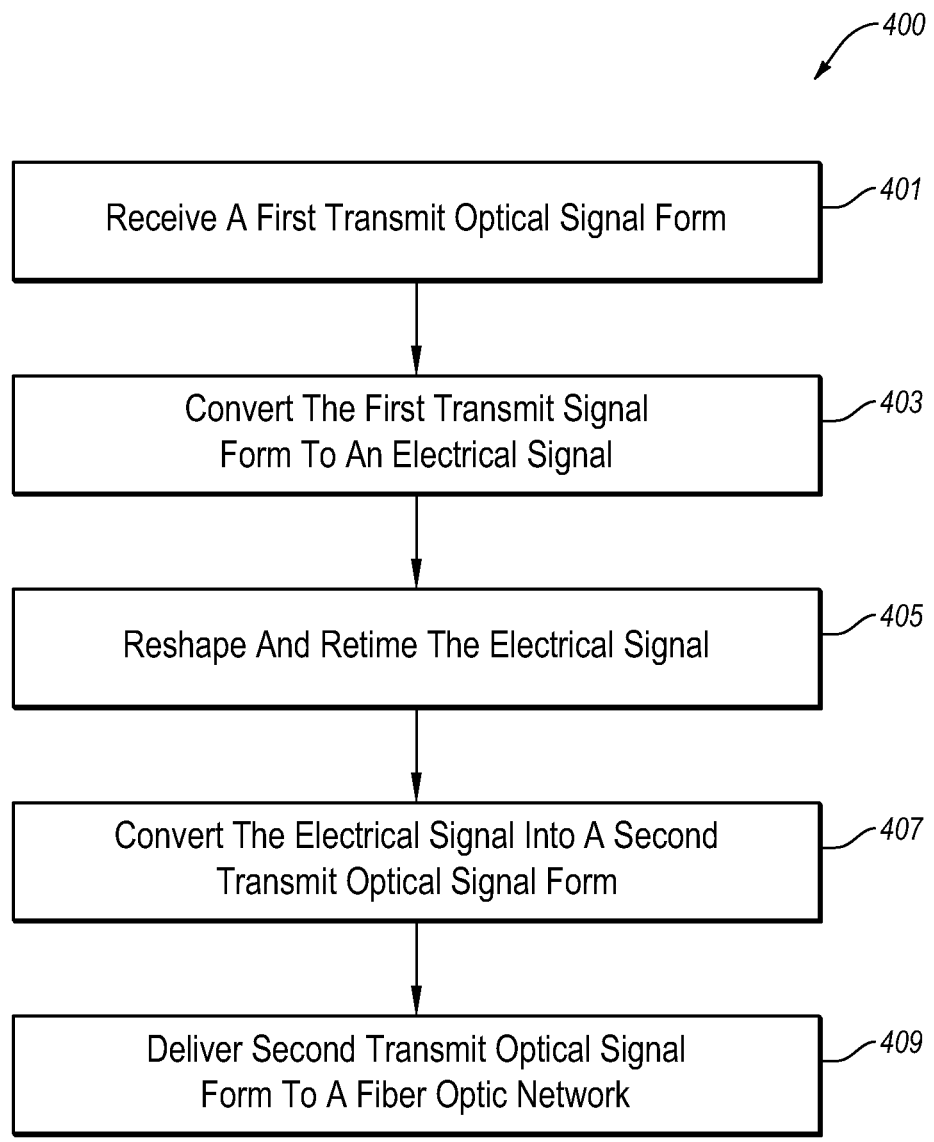
FIG. 4 is a flowchart of an example method for converting a transmit optical signal.

FIG. 4 is a flowchart of an example method 400 for converting a transmit optical signal. In some embodiments, the method 400 may be performed by a DOEC module, such as the DOEC module 102 described above. The method 400 may include receiving a first transmit optical signal form 401. The first transmit optical signal form may be received 401 from a host, such as the external host 100 of FIG. 1.

The method 400 may also include converting the first transmit optical signal form to an electrical signal 403. The first transmit optical signal form may be converted to an electrical signal by an optical receiver, such as the host-side receiver 217 of FIG. 2.

The method 400 may also include reshaping and retiming the electrical signal 405. The electrical signal may be reshaped and retimed by an integrated circuit, such as the integrated circuit 203 of FIG. 2. The step 405 of reshaping and retiming the electrical signal is optional and may be omitted in some embodiments.

The method 400 may also include converting the electrical transmit signal to a second transmit optical signal form 407. The electrical signal may be converted to a second transmit optical signal form by an optical transmitter, such as the fiber-side transmitter 225 in FIG. 2.

The method 400 may also include delivering the second transmit optical signal form to a fiber optic network 409. The second transmit optical signal form can be delivered to a fiber optic network by an optical port, such as the fiber-side optical port 227 in FIG. 2.

Figure 5:
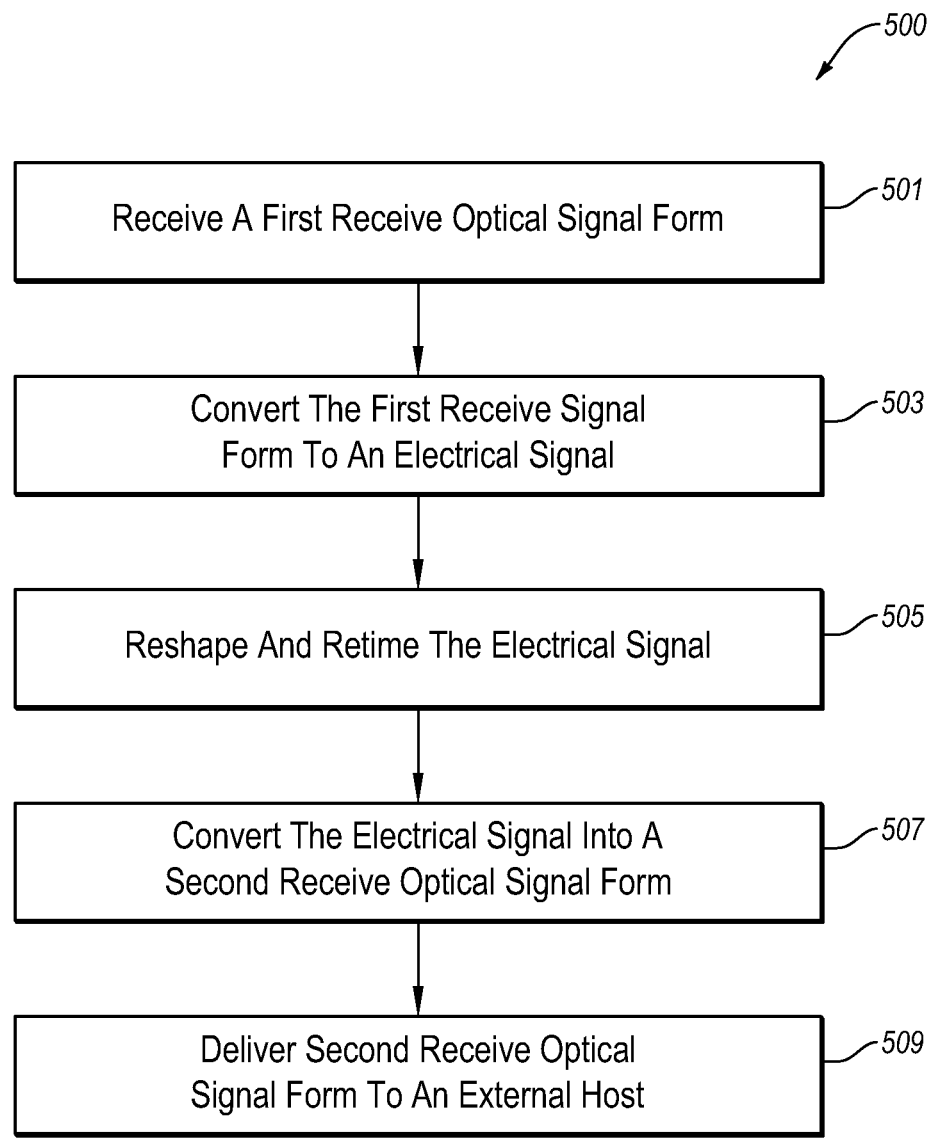
FIG. 5 is a flowchart of an example method for converting a receive optical signal.

FIG. 5 is a flowchart of an example method 500 for converting a receive optical signal. In some embodiments, the method 500 may be performed by a DOEC module, such as the DOEC module 102 described above in FIG. 2. The method 500 may include receiving a first receive optical signal form 501. The first receive optical signal may be received 501 from a link, such as one of the fiber links 112 of FIG. 1, at the fiber-side optical port 201 in FIG. 2.

The method 500 may also include converting the first receive optical signal form to an electrical signal 503. The first receive optical signal form may be converted to an electrical signal by an optical receiver, such as the fiber-side receiver 202 of FIG. 2.

The method 500 may also include reshaping and retiming the electrical signal 505. The electrical signal may be reshaped and retimed by an integrated circuit, such as the integrated circuit 203 of FIG. 2. The step 505 of reshaping and retiming the electrical signal is optional and may be omitted in some embodiments.

The method 500 may also include converting the electrical transmit signal to a second receive optical signal form 507. The electrical signal may be converted to a second receive optical signal form by an optical transmitter, such as the host-side optical transmitter 211 in FIG. 2.

The method 500 may also include delivering the second receive optical signal form to an external host 509. The second receive optical signal form can be delivered to an external host by an optical port, such as the host-side optical port 213 in FIG. 2.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

There may be other embodiments without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dual optical-electrical conversion (DOEC) module comprising:
   an optical host interface comprising an optical transmitter and an optical receiver;
   an optical network interface comprising an optical transmitter and an optical receiver; and,
   an integrated circuit configured to condition electrical signals communicated between the optical host interface and the optical network interface, wherein:
   the optical receiver of the optical host interface is selectively optically couplable to a second optical transmitter of a second optical host interface of a second DOEC module;
   in response to a fault on a first link between a host and the second optical transmitter of the second optical host interface of the second DOEC module, the optical receiver of the optical host interface is configured to receive an optical signal from the second optical transmitter of the second optical host interface of the second DOEC module and to convert the optical signal to an electrical signal; and
   the integrated circuit is configured to receive the electrical signal from the optical receiver of the optical host interface and to provide the electrical signal to the optical transmitter of the optical host interface for optical transmission to the host over a second link between the optical host interface and the host.

2. The DOEC module of claim 1, wherein the optical receiver of the host interface and the optical transmitter of the network interface are configured to cooperate to transform a transmit optical signal received from the host from a first transmit optical signal form to a second transmit optical signal form.

3. The DOEC module of claim 1 wherein the optical receiver of the network interface and the optical transmitter of the host interface are configured to cooperate to transform a receive optical signal received from an optical network from a first receive optical signal form to a second receive optical signal form.

4. The DOEC module of claim 1, wherein the optical host interface and the optical network interface are configured to cooperate with differing parameters, comprising at least one of:
   multiple different wavelengths; or
   multiple different fiber link lengths.

5. The DOEC module of claim 1, wherein the integrated circuit comprises at least one of:
   a post amplifier;
   a laser driver; and,
   a clock and data recovery circuit.

6. The DOEC module of claim 1, further comprising a management interface, the management interface comprising:
   a plurality of pins of the DOEC module;
   a control module; and
   a memory.

7. The DOEC module of claim 6, wherein the memory comprises electrically erasable programmable read-only memory (EEPROM).

8. The DOEC module of claim 6, wherein the DOEC module and the second DOEC module are configured to cooperate to allow a data carrying signal to drop and transmit from the DOEC module to the second DOEC module.

9. The DOEC module of claim 6, wherein the plurality of pins is configured to provide an electrical interface between the host and the DOEC module for at least one of communicating alarms, controls, digital diagnostic monitoring, two-wire communication, rate select and power supply.

10. The DOEC module of claim 9, wherein the alarms comprise at least one of:
- a fault signal from the optical transmitter of the optical host interface;
- a fault signal from the optical transmitter of the optical network interface;
- a loss of signal from the optical receiver of the optical host interface; and
- a loss of signal from the optical receiver of the optical network interface.

11. A method for transforming an optical signal, the method comprising:
- receiving a first optical signal in a first optical signal form;
- converting the first optical signal to an electrical signal;
- reshaping and retiming the electrical signal;
- converting the reshaped and retimed electrical signal into a second optical signal in a second optical signal form;
- transmitting the second optical signal through a selectively activated reflector positioned in a signal path of the second optical signal to an electro-optical conversion chip (e/o chip) coupled to an Application Specific Integrated Circuit or Physical layer (ASIC/PHY) chip of an external host;
- in response to detecting a loss of signal fault of the second optical signal, activating the reflector to redirect the second optical signal from a first DOEC module that generated the second optical signal to a different second DOEC module;
- generating a third optical signal representing the second optical signal at the second DOEC module; and
- transmitting the third optical data signal from the second DOEC module to the e/o chip of the external host.

12. The method of claim 11, wherein a wavelength of the second optical signal in the second optical signal form is different than a wavelength of the first optical signal in the first optical signal form.

13. The method of claim 11, wherein:
- receiving the first optical signal in the first optical signal form includes receiving the first optical signal from the e/o chip coupled to the ASIC/PHY chip of the external host, the first optical signal being received over a first fiber link from the e/o chip having a first link length; and
- the second optical signal in the second optical signal form is suitable for a second link length of a second link to a network, the second link length being different than the first link length.

14. The method of claim 13, wherein the second optical signal in the second optical signal form has a different wavelength than the first optical signal in the first optical signal form.

15. The method of claim 11, wherein:
- receiving the first optical signal in the first optical signal form includes receiving the first optical signal from a network over a first fiber link having a first link length; and
- the second optical signal in the second optical signal form is suitable for a second link length of a second link to the e/o chip coupled to the ASIC/PHY chip of the external host, the second link length being different than the first link length.

16. The method of claim 15, wherein the second optical signal in the second optical signal form has a different wavelength than the first optical signal in the first optical signal form.

17. A system for transforming optical data signals to be adaptable to differing parameters between a host and a network, the system comprising:
- a host application specific integrated circuit or physical layer (ASIC/PHY) chip;
- an electro-optical conversion chip (e/o chip) coupled to the ASIC/PHY chip;
- a plurality of optical ports optically coupled to the e/o chip;
- a plurality of DOEC modules, each optically coupled to a corresponding one of the plurality of optical ports on a host side and to a network on a network side of the corresponding module; and
- a selectively activated reflector positioned in a first optical link between the e/o chip and a first DOEC module included in the plurality of DOEC modules, wherein:
  - the e/o chip is configured to convert electrical data signals from the ASIC/PHY chip to optical data signals in a first form emitted to the plurality of DOEC modules coupled to the plurality of ports;
  - each of the plurality of DOEC modules is configured to convert optical data signals in the first form received from the e/o chip to optical data signals in a second form emitted onto the network;
  - each of the plurality of DOEC modules is further configured to convert optical data signals in a third form received from the network to optical data signals in a fourth form emitted to the e/o chip; and
  - the e/o chip is further configured to convert optical data signals in the fourth form received from the plurality of DOEC modules to electrical data signals emitted to the ASIC/PHY chip;
  - the first DOEC module is configured to emit a first optical data signal in the fourth form that is transmitted through the selectively activated reflector to the e/o chip in an absence of detection of a loss of signal fault of the first optical data signal;
  - in response to detection of a loss of signal fault of the first optical data signal, the selectively activated reflector is configured to redirect the first optical data signal to a second DOEC module included in the plurality of DOEC modules;
  - in response to receipt of the first optical data signal from the first DOEC module, the second DOEC module is configured to generate a second optical data signal that represents the first optical data signal; and
  - the second DOEC module is configured to transmit the second optical data signal to the e/o chip over a second optical link between the e/o chip and the second DOEC module.

18. The system of claim 17, wherein each of the plurality of DOEC modules comprises:
- an optical host interface comprising an optical transmitter and an optical receiver;
- an optical network interface comprising an optical transmitter and an optical receiver; and,
- an integrated circuit configured to condition electrical signals communicated between the optical host interface and the optical network interface.

* * * * *